April 17, 1928. 1,666,236
S. W. FUERTH
SIGHT INSTRUMENT FOR AUTOMOBILES
Filed Jan. 19, 1927
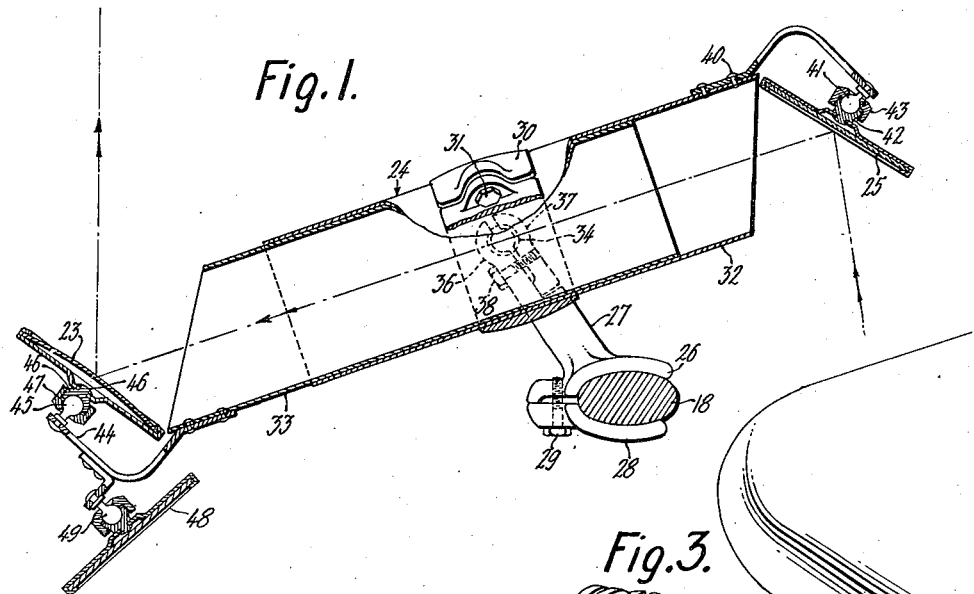
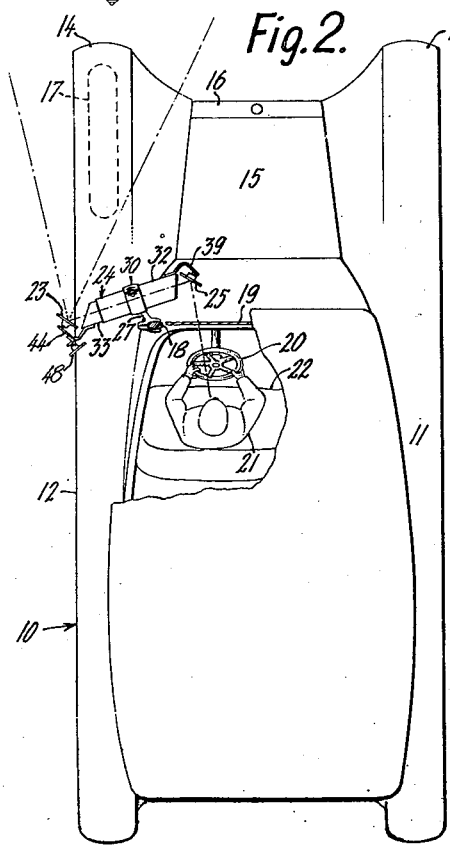
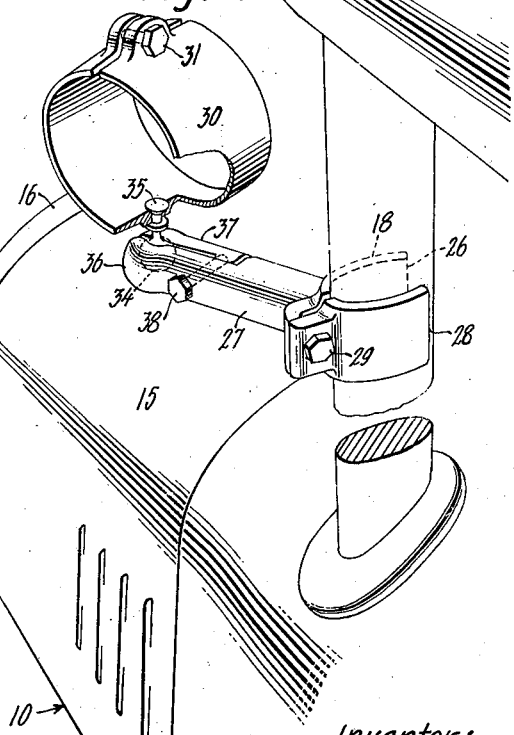
Inventor:
Sydney W. Fuerth
by B. C. Stickney
Attorney Patented Apr. 17, 1928.

1,666,236

UNITED STATES PATENT OFFICE.

SYDNEY W. FUERTH, OF MAPLEWOOD, NEW JERSEY.

SIGHT INSTRUMENT FOR AUTOMOBILES.

Application filed January 19, 1927. Serial No. 162,003.

This invention relates to sight instruments for automobiles, and one of its main objects is to afford the driver a better forward view of the road, particularly of objects that are usually obscured by the left-hand front mud-guard and by the hood of the engine, and also by automobiles or other large objects in advance of his car, and also a view of the front wheel and of its direction.
The driver's seat is usually just back of the steering wheel, and his head is usually well within the car, say at a point about two feet to the right, measuring from the left-hand edge of the running-board. This awkwardness of position has led to the dangerous practice of sidling the car towards the left and out of line with cars ahead, or "nosing" out of the line in which the car is traveling, in order to enable the driver to see the line or column and the road ahead, his usual object being to take advantage of the slow-moving column, and secure a more advanced position therein when opportunity offers. The inability to see the road ahead at the left of the column, always causes great inconvenience, and often leads to an accident; and it is one of the objects of the present invention to obviate these difficulties and conduce to safety of operation. The invention, however, has other uses.

To secure these advantages, I provide a forward-view compounded angle-mirror or speculum at the upper part of the car, at a point preferably directly over the outer edge of the left-hand running-board, for the purpose of reflecting to the eye of the driver the road at the left of the cars ahead, and also the forward wheel at the left-hand side of the car, and also the road and objects therein immediately in front of the hood of the engine. The objects may be reflected by an outer mirror, which may be set at an angle, and its reflections may be given to the eye of the driver by the aid of a second mirror, which has a corresponding angle, and may be placed preferably in front of the wind-shield and preferably above the head of the driver, so as not to restrict his usual outlook. By means of the second mirror the driver can see the objects that are reflected in the first mirror, said mirrors being at acute angles to the car and about parallel to each other, and the outer mirror being preferably slightly convex, so as to give ample field of vision. The driver is thus enabled to see ahead in the manner already pointed out, and is also enabled to view the front wheel which is hidden under the mud-guard, so that he can see the direction in which the wheel, and hence the car, is about to move, this being a desideratum for parking and turning corners and backing. The general advantage is the same as if the driver could stand on the running-board where he could see directly the points above mentioned.

Each mirror may be universally adjustable independently of the other, and both are mounted upon a bracket which is adjustable for height. The instrument preferably embodies a barrel extending from one mirror to the other and through which the light travels, the barrel being also universally and independently adjustable. The barrel may also be telescopic, whereby the mirrors may be adjusted towards and away from each other. When the parts are properly aligned and adjusted, the instrument or device will show to the driver at least one hundred yards or more of the road immediately ahead, even though a car immediately in front of the driver is blocking the entire ordinary view.

Other features and advantages will hereinafter appear.

In the accompanying drawings, Figure 1 is a perspective plan of the instrument applied to the left-hand post of an automobile.

Figure 2 is a plan of a car, showing diagrammatically one position in which the device may be placed thereon.

Figure 3 is a perspective, showing the bracket whereby the device may be attached to said post at different elevations, and also illustrating an annular clip for holding the sight-barrel of the instrument upon said bracket. This view shows a universally adjustable ball-and-socket joint connected to said barrel-clip for universally adjusting the barrel.

The automobile 10 has the usual right and left hand running-boards 11 and 12, front mud-guards 13 and 14, engine-hood 15, and front radiator 16. The left-hand front wheel, which is one of the objects that it is desired to bring into view, is indicated at 17. The usual left-hand front post is seen at 18 at the left of the usual glass windshield 19; the steering wheel being indicated at 20, the driver at 21, and the driver's seat at 22.

At a point directly above the outer edge of the left-hand running-board 12, and at the upper portion of the car, is mounted an angular mirror 23, which is preferably slightly convex, Figure 1, and may be of any desired diameter. By means of this mirror the forward view of the road at the left of the car, and of the cars ahead, and also of the front wheel 17, and of the portion of the road immediately in front of the engine, is reflected inwardly of the car through a barrel 24, which extends inwardly from said mirror and is open at both ends. On the inner end is mounted a second angular mirror 25, preferably plane, from which the view is reflected back to the driver at 21; the angle of one mirror having proper correspondence with that of the other.

The instrument is adjustable up and down the front post 18, being for that purpose secured thereon by means of a two-part clamp, one part 26 carrying an instrument-arm 27, and the other part 28 being secured to 26 by a clamping screw 29, so as to secure the instrument at any desired height. The bracket-arm 27 extends outwardly and carries on its outer end an annular clip 30, which, by means of a bolt 31, may be tightened upon the sight-barrel 32. In the latter slides a telescopic member 33 for varying the distance between the coacting mirrors 23 and 25. The barrel may be turned as a unit in any direction by means of a universal joint, which includes a ball 34 riveted at 35 to the annular clip 30, and a socket-piece in which the ball fits, said socket-piece including two cupped members 36 and 37. Member 36 may be integral with arm 27, and 37 may be separate, but held tightly by a clamping screw 38.

Of the mirrors the inner one 25 may be mounted upon the end of an arm 39 that is riveted at 40 to the inner end of the barrel 32; which may be slidden through the ring-clip 30 when the latter is loosened, thus affording readjustment of the sight-barrel and the mirrors as a unit, while preserving the independent adjustment of each mirror thereon. Said mirror 25 is mounted for universal adjustment upon the arm 39 by means of a ball-stud 41 riveted on the arm, and socket-piece 42 riveted on the back of the mirror; a cupped nut 43 being threaded upon the socket-piece to fasten the mirror in any position where adjusted.

The outer mirror 23 is similarly mounted upon the outer end of the telescopic slide 33, by means of an arm 44, a ball-stud 45, a socket-piece 46 riveted to the mirror, and a securing nut 47.

Dot-and-dash lines indicate diagrammatically the scope of vision of the outer mirror, and also the general course that the reflection takes therefrom through the sight-barrel to the inner mirror, and the general direction in which the reflecton from the inner mirror reaches the driver. It should be understood that the whole device may be located about on the level of the eye of the driver, or even at some distance above his head, and that alterations in the vertical adjustment of the device may be compensated for by tipping one or both of the mirrors. It should also be understood that the telescopic arrangement permits the outer mirror to be extended farther out than is shown in Figure 2, if desired; and that it may at times be pushed inwardly as far as required. If the device is above the eye of the driver, the barrel may be turned to raise or lower either end by means of the ball-and-socket joint at 34, while the mirrors may be individually adjusted to give the eye of the driver the proper range of vision.

If desired, a mirror 48 may be mounted by a universal joint 49 upon the outer end of the barrel 32, so that the single device will afford means for affording a rear view as well as for the above-described lateral front view.

It will be seen that the device is inexpensive, durable, reliable, compact and readily attached, or built in if desired.

So long as the device affords the described forward view from the outside, it is not essential in all cases that the rays of light be deflected by means of mirrors, as it is known that light may be deflected by other means.

In referring herein to the "left" side of the car, the driver's side is meant. The invention is not limited to the use of two reflectors, as the series may be compounded of some other number.

Variations may be resorted to within the scope of the invention, and portions of the improvements may be used without others.

Having thus described my invention, I claim:

In a forward sight-instrument for automobiles, the combination of a barrel, said barrel open at both ends, parallel mirrors at the ends of the barrel, said mirrors cooperative to reflect back to the driver objects in front and to one side of the car, a clamp securing means securing said instrument to the side post of the automobile, said securing means including a bracket-arm having at one end a bracket-post clamp, and having at its outer end an annular clip, said barrel being held to said bracket by means of said clip, and a universal joint connecting said barrel to said bracket-arm or base.

SYDNEY W. FUERTH.